March 30, 1943. J. R. GOMERSALL 2,315,327
THERMAL TIMER FOR AUTOMATIC TOASTERS
Filed Aug. 7, 1939 3 Sheets-Sheet 1
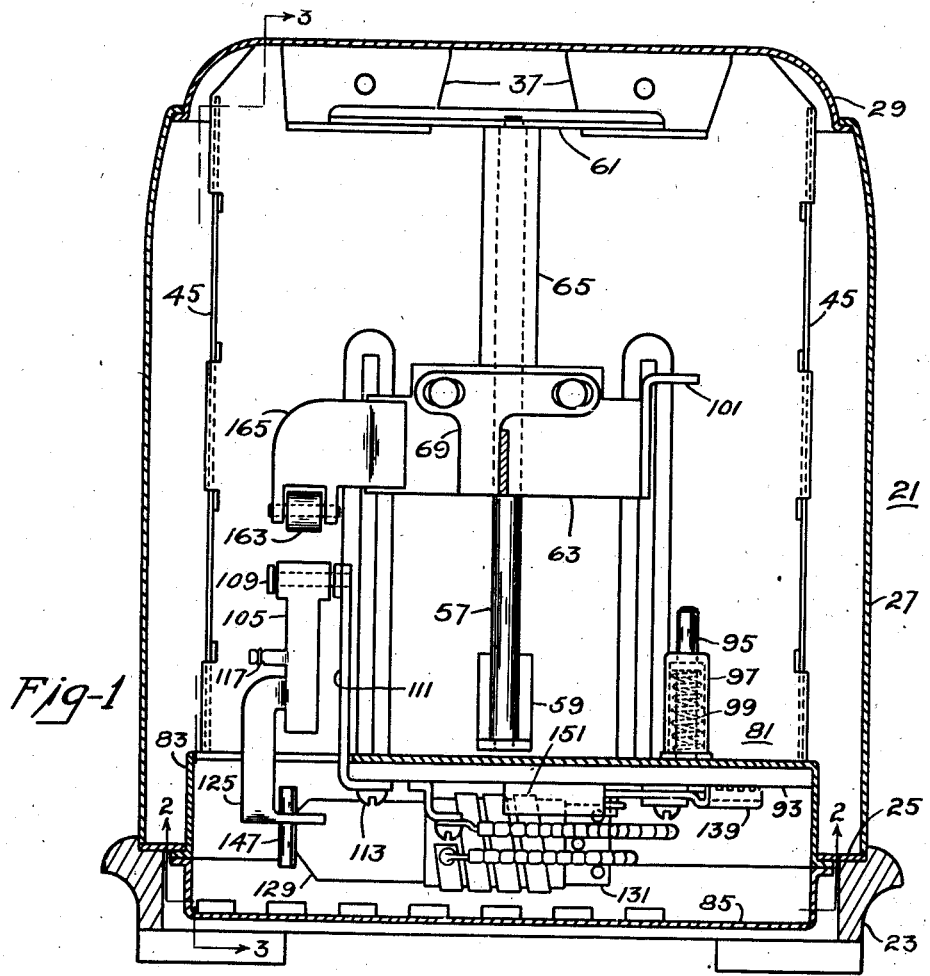
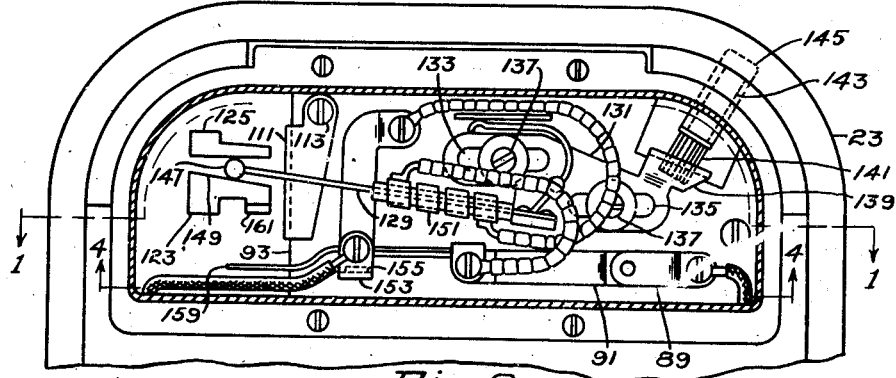
INVENTOR
JOHN R. GOMERSALL
BY
ATTORNEY

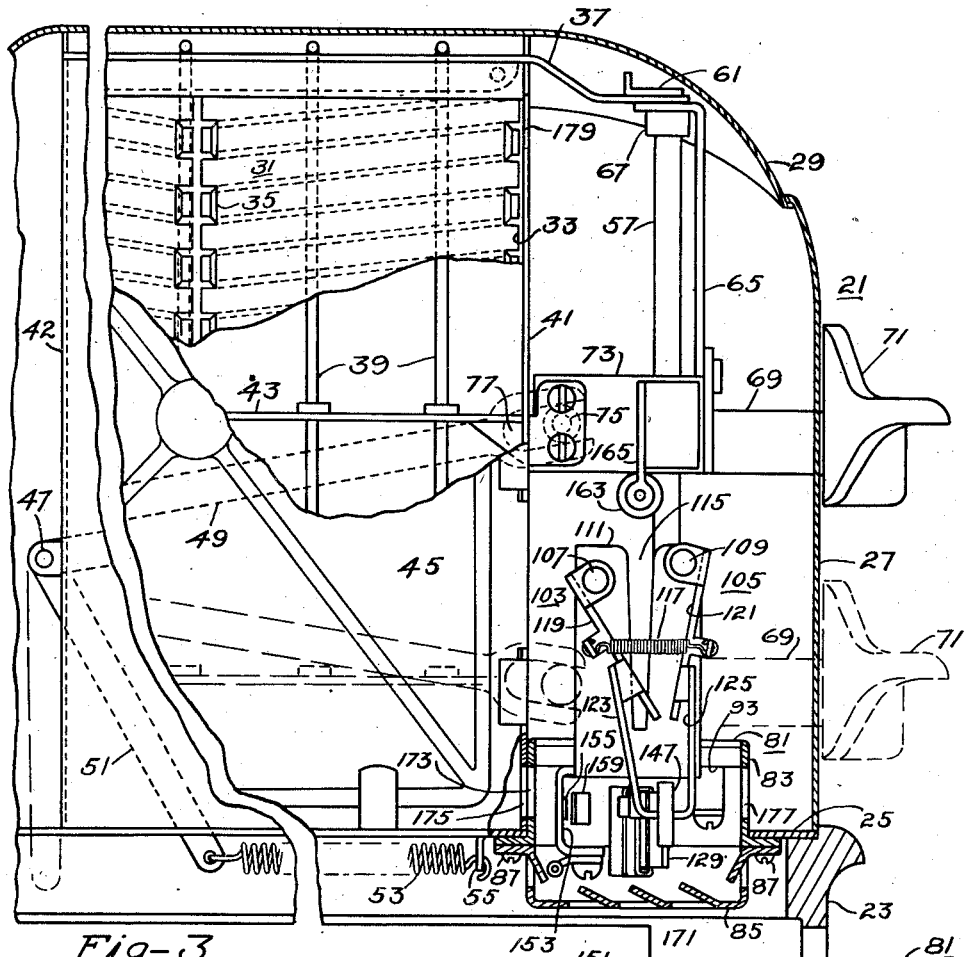
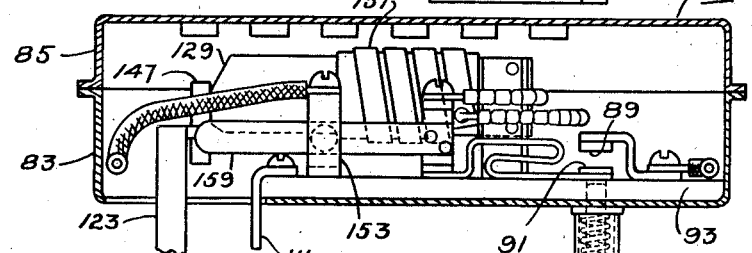
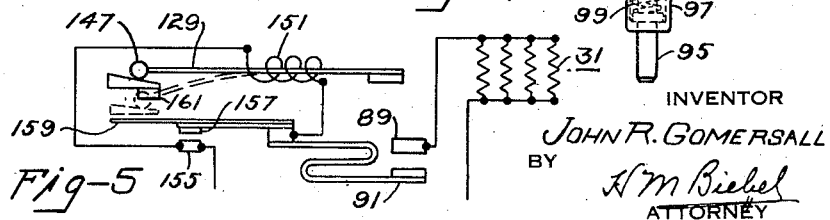
Fig-3
Fig-4
Fig-5
INVENTOR
JOHN R. GOMERSALL
BY
ATTORNEY

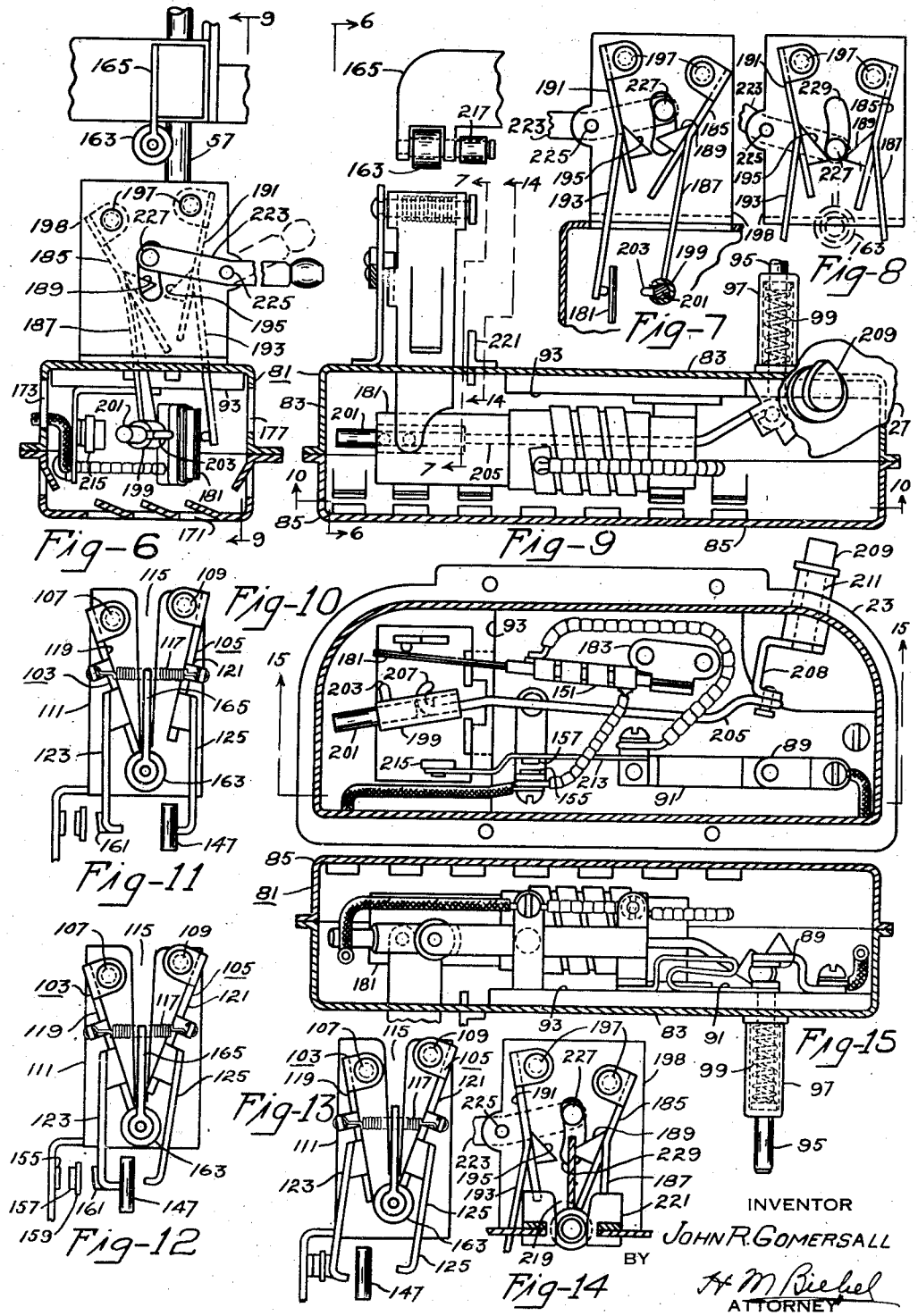

Patented Mar. 30, 1943

2,315,327

UNITED STATES PATENT OFFICE 2,315,327

THERMAL TIMER FOR AUTOMATIC TOASTERS

John R. Gomersall, Elgin, Ill., assignor to McGraw Electric Company, Elgin, Ill., a corporation of Delaware Application August 7, 1939, Serial No. 288,740

9 Claims. (Cl. 219—19)

My invention relates to automatic electric toasters and particularly to novel timing means therefor.

An object of my invention is to provide a relatively simple unitary assembly for a detent means and a thermal timing means to effect release of the detent means when applied to an electric cooking device.

Another object of my invention is to provide a novel form of thermal timer structure operable on a heat-up cool-off principle to control the duration of a toasting operation to obtain substantially uniform toasting of successive slices of bread under all ordinary operating conditions.

Another object of my invention is to provide a plural detent structure controlled by a thermal timing means constructed and arranged to operate on a heat-up cool-off cycle so that one of said detents defines the heat-up period and another detent defines the cool-off period of the thermal timing means.

Other objects of my invention will either be apparent from a description of several forms of devices embodying my invention or will be pointed out in the course of such description and will be set forth in the appended claims. Since further obvious modifications and changes may be made by those skilled in the art, the appended claims are to be construed to cover all such modifications as clearly come within their scope.

In the drawings,

Figure 1 is a vertical lateral sectional view of an electric toaster embodying my invention, taken on the line 1—1 of Fig. 2, Fig. 2 is a horizontal sectional view taken on the line 2—2 of Fig. 1 and showing one form of thermal timer embodying my invention, Fig. 3 is a fragmentary vertical longitudinal sectional view taken on the line 3—3 of Fig. 1, Fig. 4 is a vertical sectional view through the timing device shown in Figs. 1 to 3 inclusive and taken on the line 4—4 of Fig. 2, Fig. 5 is a diagram of connections used with my improved toaster and timer, Fig. 6 is a fragmentary view partially in vertical section and partially in end elevation, taken on the line 6—6 of Fig. 9 and showing a modified form of thermal timer, Fig. 7 is a fragmentary view thereof partially in vertical section and partially in end elevation, taken on the line 7—7 of Fig. 9, Fig. 8 is a view similar to Fig. 7 but showing the detents in another position, Fig. 9 is a view partially in vertical lateral section and partially in front elevation taken on the line 9—9 of Fig. 6, Fig. 10 is a view in horizontal section therethrough taken on the line 10—10 of Fig. 9, Figs. 11, 12 and 13 are fragmentary views in end elevation showing various positions of the two detents of the timer assembly shown in Figs. 1, 2, 3 and 4, Fig. 14 is a view mainly in end elevation and partially in section, taken on the line 14—14 of Fig. 9, and, Fig. 15 is a vertical lateral sectional view taken on the line 15—15 of Fig. 10.

Referring first to Figs. 1 and 3 of the drawings, I have there illustrated a toaster assembly 21 which includes a skeleton base frame 23 which may be made of a suitable moulded composition material and which may have secured against the upper surface thereof a bottom or base plate 25 which may be made of relatively thin sheet metal. An outer casing 27 comprising front, back and two side walls may be suitably secured against the upper surface of plate 25 by any means now well known in the art. The case is completed by a cover member 29 which has interfitting engagement with the upper flanged edge of casing 27, all in a manner well known in the art.

The toaster assembly includes further a plurality of pairs of electric heating elements 31 each of which includes one or more plates 33 of electric insulating material, such as mica, on which there is wound a resistor strip 35, all in a manner now well known in the art. I have shown a toaster structure adapted to toast two slices of bread simultaneously although I do not desire to be limited thereto. In this case I provide a total of four planar heating elements 31 extending in a substantially vertical direction and the lower ends of these heating units may have interfitting engagement with the bottom plate 25 to thereby hold the lower edges of the respective heating units in the desired and proper operative positions. The heating units may have their upper edges in operative engagement with depending side portions of longitudinally extending top frame plates 37, which frame plates also support guard wires 39 depending therefrom. A front intermediate wall 41 and a rear intermediate wall 42 are provided, in a manner well known in the art.

Means for supporting slices of bread in the toasting chamber constituted by the outmost heating elements, the front and rear intermediate walls, the cover member 29 and the bottom plate 25 may comprise bread carriers 43 which, as shown in Fig. 3 of the drawings, have interfitting slidable engagement with the guard wires 41, also in a manner now well known in the art. A pair of side or baffle plates 45 may be provided if desired. It is desired to yieldingly bias the bread carriers to their upper or non-toasting position and this is effected by the use of a bell-crank lever pivotally mounted on the rear intermediate wall of the toaster assembly as on a pivot pin 47. This bell-crank lever has a substantially vertically extending longer arm 49 and a depending shorter arm 51. One end of a biasing spring 53 is anchored to a lug 55 punched out from the bottom plate 25 while the other end thereof is connected to the lower end of arm 51.

A vertical standard 57 has its lower end supported by a bracket 59 secured to the front intermediate wall 41 while its upper end is supported in a cross bar 61 which may be connected to and supported by forwardly extending portions of the top frame plates 37. A carriage 63 is slidably supported for vertical movement on the standard 57 and may have an upward extension 65 thereon at the upper end of which there is mounted a bushing 67 surrounding the standard 57 to properly guide the carriage in its vertical movements. A second such bushing may be provided at the lower end of member 65 if desired, but is not visible in the drawings. A bracket 69 is loosely mounted on the carriage 63 and has a portion extending forwardly therefrom through a slot in the front wall of the casing 27 and an actuating knob 71 may be mounted on the bracket 69 to permit of an operator moving the carriage downwardly from its normal non-toasting position to its toasting position. The carriage 63 may be provided with rearwardly extending portions 73 to which forwardly extending portions of the bread carriers may be suitably secured in a manner well known in the art and a cross bar 75 with a roller thereon may interfit with a slot 77 in the forward end of arm 49 so that pressure exerted on member 71 in a downwardly direction will cause downward movement of the bread carriers 43 and a tensioning of biasing spring 53.

A thermal timer assembly constituting more particularly my invention is enclosed in a housing or casing 81 which casing includes an upper portion 83 and a lower complementary portion 85. This housing is located in an opening in the forward part of bottom plate 25 in a part of the toaster which may be termed the mechanism chamber which is to be considered as that portion in front of the front intermediate wall 41 and back of the front wall of the casing 27. The two portions 83 and 85 of the housing may be secured together and in proper operative position by a plurality of small machine screws 87.

I provide a substantially fixed contact member 89 and a resiliently supported movable contact member 91, both of which are mounted on a plate 93 of electric insulating material, which plate 93 is suitably secured against the inside of housing portion 83. An actuating rod 95, preferably of electric-insulating material, is positioned within a tubular member 97 and is biased out of engagement with contact member 91 by a spring 99 positioned within tubular member 97. Means for engaging and moving rod 95 to cause engagement of contact member 91 with contact member 89 may include an extension 101 (see Fig. 1) secured in proper position on carriage 63 at one side thereof so that when the carriage has been moved to its lowermost or toasting position a part of extension 101 will engage rod 95 and press it downwardly to cause engagement of contact members 89 and 91.

I provide further a pair of yieldingly connected detents 103 and 105, each of which is individually pivotally mounted as on pivot pins 107 and 109, which pivot pins are secured to upwardly extending bracket 111, the lower end of which may be secured as by one or more machine screws 113 to plate 93 hereinbefore described. Pivot pins 107 and 109 are spaced apart a suitable distance on either side of a central vertical slot 115, which slot is provided for a purpose which will presently appear. The two detents 103 and 105 are of generally elongated lever arm shape and a biasing spring 117 has its respective ends connected to the detent arms 103 and 105 intermediate their ends to bias them toward each other, as will be noted particularly by reference to Fig. 3 of the drawings. The detents 103 and 105 which have been stated as being of substantially lever arm shape, include main arms 119 and 121 and secondary arms 123 and 125, the latter arms extending angularly relatively to the main portions 119 and 121 respectively, and from intermediate the ends of portions 119 and 121. The portions 123 and 125 may be provided with laterally extending end portions for purposes of easier operation.

The thermal timer positioned within the housing 81 includes also a bimetal bar 129 having one end thereof fixedly supported by a depending portion of a bracket 131 which is secured in any suitable or desired manner against the bottom surface of plate 93. This bracket 131 is provided with a pair of elongated slots 133 and 135 through which securing screws 137 may extend in such manner that the bracket may be moved bodily in a direction extending substantially laterally of the toaster assembly and longitudinally of the casing 81. Means for effecting this movement may include an extension 139 on bracket 131 having gear teeth cut therein which teeth are engaged by a pinion 141 mounted on a shaft 143 which has an adjusting knob 145 secured thereon outside of the casing to permit of turning movement of pinion 141, causing shifting movement of the support of the bimetal bar 129. The free end of bimetal bar 129 may be provided with a small rod-like member 147 secured thereto, which member 147 is normally in engagement with the hereinbefore described extensions on the detent arms 123 and 125. It may be pointed out at this time that the extension on arm 123 is provided with an angularly extending or cam surface 149 for a purpose to be hereinafter set forth.

An auxiliary heating element 151 is insulatedly mounted on bimetal bar 129 intermediate its ends, the connections of this auxiliary heater being shown particularly in Fig. 5 of the drawings. A bracket 153 suitably secured against block 93 is provided with a contact member 155 thereon and a cooperating movable contact member 157 is moved into engagement with fixed contact member 155 by a spring arm 159 under certain operating conditions of the toaster as will be hereinafter set forth. These contact members are electrically connected to the auxiliary heater 151 as shown in Fig. 5. It will be noted that initially the auxiliary heating element 151 is energized simultaneously with the energization of the main or toast heating elements 31, by being connected in electrical series circuit relation therewith. When the bimetal bar 129 has been heated by heat generated in the auxiliary heater 151 it moves or flexes in a counter-clockwise direction as seen in Figs. 2 and 5 of the drawings, moving detent portion 123 and detent 103 in a clockwise direction (as seen in Fig. 3 of the drawings) so that ultimately a small lug 161 of electric-insulating material, on the extension of arm 123 will engage spring arm 159 and move it to cause engagement of contact members 157 and 155 whereby the auxiliary heating element 151 is short-circuited.

Referring now to Fig. 11 of the drawings, I have there illustrated the position occupied by the detents when the carriage 63 has been moved downwardly so that a latching roller 163, suitably supported on carriage 63, as on a bar 165, has been moved to the position shown in Fig. 11 of the drawings with the bar 165 in guide slot 115 and with the roller engaging under the lower end of portion 119 of detent 103. It is obvious that the roller 163 engages and moves along the inside surface of portion 119 of detent 103 during its downward movement whereby the detent 103 is moved in a clockwise direction, as seen in Fig. 11, and that finally the roller 163 engages under the lower end of portion 119 to be held thereby in its lowered position. It is also to be noted that portion 123 of detent 103 has been moved out of engagement with rod 147 which, as has been hereinbefore set forth, is secured to the outer end of bimetal bar 129. The rod 147 will occupy the position shown in Fig. 11 immediately after initiation of a toasting operation effected by downward movement of the carriage, knob and bread carrier into toasting position.

Referring now to Fig. 12 of the drawings, I have there illustrated the position occupied by rod 147 when the bimetal bar has been heated and flexed causing movement of rod 147 toward the left, as seen in Fig. 12 of the drawings, rod 147 being shown as having just engaged the extension on the lower end of portion 123 but not yet having effected any appreciable movement thereof. Further heating of the bimetal bar will result in further movement of rod 147 in a left-hand direction as seen in Fig. 12 until the lug 161 on arm 123 will engage bar 159 and move contact member 157 thereon into engagement with fixed contact member 155 to thereby short circuit the auxiliary heating element 151. The latter part of the movement of rod 147 on bimetal bar 129 also has resulted in disengagement of the latch roller 163 from the lower end of arm 119 and a slight upward movement of the carrier, the knob and parts 163 and 165, until roller 163 engages under the lower end of portion 121 of detent 105. This position of the roller 163 is shown in Fig. 13 of the drawings, it being evident that arm 125 was caused to follow for at least a part of the time the movement of member 147, because of spring 117, as was hereinbefore explained, this follow-up movement of portion 125 continuing until the lower end of portion 121 of detent 105 engages a side of bar 165.

Since, as has just been described, the initial flexing movement of bimetal bar 129 resulted finally in deenergization of the auxiliary heating element 151, the bimetal bar was then subjected to a cooling action with consequent reverse flexing movement of its free end so that rod 147 would move in the opposite direction or toward the right, as seen in Figs. 11, 12 and 13, until at some lower, predetermined temperature of the bimetal bar, rod 147 will again engage the extension on portion 125 of detent 105 and cause the detent 105 to turn in a counter-clockwise direction until the lower end of portion 121 has been disengaged from roller 163 whereby quick upward movement of the bread carrier is permitted because of the tension of biasing spring 53, as has been hereinbefore set forth.

It is obvious that with a given position of the supporting bracket 131, the distance through which cam surface 149 is moved away from rod 147 when the bread carrier is moved into toasting position will be constant for a given temperature of the bimetal bar and that therefore the bimetal bar must be heated to a predetermined temperature before it will again engage the cam surface 149. If, now, it is desired to shorten the time of heat-up of the bimetal bar, it is only necessary to cause movement of the support 131 and therefore of the bimetal bar 129 and the rod 147 thereon in a direction toward the left, as seen in Fig. 2 of the drawings. If, on the contrary, it is desired to increase the time of heat-up of the bimetal bar and therefore increase the total duration of a toasting operation, the bracket 131 is moved toward the right as seen in Fig. 2 of the drawings. When either of these movements are effected prior to the start of a toasting operation, the rod 147 remains in contact with cam surface 149 regardless of its right hand or left hand movement. However, the cam surface 149 and the lug 161 on arm 123 moves toward or away from the spring arm 159 in accordance with the right or left hand movement of rod 147.

In order to insure quick cooling of the bimetal bar as well as a quick response to energization of the auxiliary heating element 151 I prefer to use relatively thin wide resistor strip for the auxiliary heater 151 and to make the thermal mass of the bimetal bar and of the auxiliary heater structure relatively small and it will be noted that I have illustrated a rather wide bimetal bar 129 which will aid in quick cooling or temperature reduction of the bimetal bar upon deenergization of the auxiliary heater 151. I prefer further to provide a plurality of apertures 171 in the lower portion of housing 81 and I may provide a plurality of apertures 173 at the rear portion of housing portion 83 as seen in Fig. 3 of the drawings, there being registering openings 175 provided in the front intermediate wall 41 so that a through draft may be created by the main toast-heating elements which causes cooling air to enter the apertures 171 and flow through the registering openings 173 and 175 and upwardly through the toasting chamber. I may provide apertures 177 in the front wall of portion 83 through which a cooling draft may flow upwardly through the mechanism chamber and outwardly through apertures 179 provided in the upper end of front intermediate wall 41. I have found that a structure of this kind will operate to make uniform toast that is browned to substantially the same degree, in successive toasting operations, irrespective of the temperature conditions of the toaster structure and irrespective of the time intervals elapsing between successive toasting operations. It may be here noted that while the lengths of the heat-up periods of the thermal element may be varied, the lengths of the cool-off periods of the thermal timer are substantially constant for any given setting of the thermal timer assembly.

It may further be here pointed out that the plurality of detents which I provide are effective to determine or define respectively the heat-up period and the cool-off period of the thermal timer.

Referring now to Figs. 6, 7, 8, 9, 10, 14 and 15 of the drawings, I have there illustrated a modified form of thermal timer and all such parts as are the same as in the modification already described have been given the same identifying numerals and only those parts which are different have been given new or different numbers. A bimetal bar 181 is fixedly mounted as by a supporting bracket 183 and has insulatedly mounted thereon an auxiliary electric heating element 151 of the same kind as already hereinbefore described.

The first of a pair of detents similar in general to those hereinbefore described includes an upper portion 185 and a lower angularly extending portion 187 and a cam surface 189 extending laterally of portion 185 as will be seen by reference to Figs. 7, 8 and 14 of the drawings. A second detent includes an upper portion 191 and a lower portion 193 extending angularly relatively to portion 191 as well as a cam surface 195 extending laterally of portion 191. Each of these detents is pivotally mounted as by pivot pins 197 on a supporting plate 198. The portion 187 of the first detent has a tubular member 199 secured thereto at its bottom which tubular member has positioned therein an adjustable rod 201 having laterally extending pin 203 secured thereto, which pin moves in a slot in tubular member 199. A link 205 has a hook end 207 interfitting with the inner end of rod 201 and has its other end pivotally connected to a crank arm 208, which crank arm may be turned by an adjusting knob 209 positioned outside of the casing 27 and causing turning movement of a short shaft 211 suitably supported as in the skeleton frame 23. It will be noted particularly that tubular member 199 extends angularly relatively to the bimetal bar 181 so that as members 201 and 203 are shifted in their support 199, the distance between bimetal bar 181 and extension 203 may be varied as will be hereinafter pointed out. A substantially fixed contact member 155 is adapted to be engaged by a contact member 157 mounted on a spring arm 213. The outer end of this arm 213 has mounted thereon a small block 215 of electric insulating material which block is adapted to be engaged under certain operating conditions by tubular member 199 when the same has been moved by flexing action of bimetal bar 181 because of temperature rise thereof. The electrical connections of the auxiliary heater 151 of the contact members 89 and 91 are identical with that hereinbefore described and these connections are shown in Fig. 5 of the drawings.

Means for holding the latch roller 163 in substantially fixed lateral position relatively to the thermal timer during a toasting operation may include a second roller 217 mounted on portion 185, which roller 217 is adapted to fit into a guide slot 219 in a guide bracket 221 (see Figs. 9 and 14 of the drawings).

When the bread carriers are moved to their lower, toasting position, the roller 163 will engage the inner surface of portion 185 of the first detent and cause it to move slightly in a clockwise direction, as seen in Fig. 6, until the roller 163 has engaged under the lower end of portion 185, in substantially the same manner as was hereinbefore set forth for the other modification of timer and detent means. The energized auxiliary heater 151 causes heating of the bimetal bar 181 and flexing of its free end in a counter-clockwise direction as seen in Fig. 10 of the drawings. Ultimately the bimetal bar will engage the pin 203 and move it into operative engagement with block 215 thereby causing engagement of contact members 155 and 157 to cause short-circuiting of the auxiliary heater 151. It is to be understood that when contact members 155 and 157 have been caused to engage, the first detent and particularly the lower end of portion 185, will have been moved out of engagement with roller 163. This permits the roller and the parts connected therewith to move slightly upwardly and into engagement with the lower end of arm 191 of the second detent in substantially the same manner as was hereinbefore set forth with the first modification.

The bimetal element 181 now cools and ultimately returns to substantially its initial position where it will operatively engage portion 193 of the second detent and cause the lower end portion of arm 191 to be moved away from roller 163 to thereby release the latter and the parts connected therewith to permit of quick upward movement of the bread carriers, the carriage and the knob to their upper non-toasting positions.

In this particular modification I provide manually actuable means for terminating a toasting operation at any desired time during a toasting operation, this means being shown in Figs. 6 and 8. This manual means includes an arm 223 pivotally mounted at 225 on bracket plate 198, the inner end of arm 223 having mounted thereon a roller 227 moving in an arcuate slot 229 in bracket 198. Depending upon the time at which it is desired to terminate the toasting operation, that is, either during the heat-up period or the cool-off period, the roller 227 may engage cam surface 189 or cam surface 195 or both, to cause swinging movement of the respective detent engaged by the roller 227 out of engaging position with latching roller 163 so that upward movement of the bread carriers will quickly result as has already been described.

It is obvious that the device embodying my invention, in either of its modifications, provides a relatively simple and positively operating thermal timing means for a toaster or other similar cooking device. Extended tests on electric toasters having applied thereto thermal timers of the kind herein described have shown that it is possible to obtain uniform toasting of successive slices of bread irrespective of the operating temperature of the toaster structure as well as irrespective of variations in other operating conditions, for example, variations in supply circuit voltage.

As has already been stated, the time of heating up of the thermal timer may be varied but I have found that, for a given set of conditions, the time of cool-off of the bimetal element is substantially constant. It is, however, easy to adjust the mechanism to cause the toaster to make uniform toast irrespective of variations in the operating conditions, in the temperature of the toaster and in the intervals between successive toasting operations.

I claim as my invention:

1. In an automatic electric toaster comprising toast heating elements, a control switch for said toast heating elements normally yieldingly biased into open position and means to move said switch into closed position to initiate a toasting operation, the improvement in thermal timing and detent means comprising a bimetal bar, an auxiliary electric heater for said bimetal bar adapted to be energized by the closing of said control switch, a fixed and a movable contact member connected respectively to the terminals of said auxiliary heater and normally out of engagement with each other, a first and a second detent arm, a latch for holding said switch closed and moved into direct engagement with said first detent arm when said switch has been moved into closed position, energization of the auxiliary heater causing flexing of said bimetal bar in a given direction to cause movement of said first detent arm in said given direction to disengage it from said latch and into engagement with said movable contact member to cause the latter to engage said fixed contact member and short circuit said auxiliary heater, and to cause also engagement of said latch with said second detent arm, said latch being effective when engaged by said detent arm to hold said movable contact member in engagement with said fixed contact member, the bimetal arm then cooling and flexing in the other direction to engage said second detent arm and cause disengagement thereof from said latch and opening of the control switch.

2. An automatic electric toaster comprising toast heating elements, a bread carrier movable into toasting and non-toasting positions relatively to the toast heating elements and normally yieldingly biased into non-toasting position, a latch on said bread carrier, a control switch for said toast heating elements normally yieldingly biased into open position, means to initiate a toasting operation and means to terminate a toasting operation, said terminating means including a bimetal bar fixedly supported at one of its ends, an auxiliary electric heater for said bimetal bar, means to cause energization of said auxiliary electric heater simultaneously with the initiation of a toasting operation, a first detent arm adapted to be engaged by said latch upon the initiation of a toasting operation, a fixed contact and a movable contact electrically connected to the respective terminals of said auxiliary heater, the heated bimetal bar flexing in a direction to engage and move said first detent arm into operative engagement with said movable contact and to move said movable contact into engagement with said fixed contact to short circuit said auxiliary heater when said bimetal bar has been heated to a given high temperature, said movement of the first detent arm causing release thereof from said latch, a second detent arm positioned to be engaged by said latch when the latter has been released from said first detent arm, said latch being effective when engaged by said second detent arm to hold said movable contact in engagement with said fixed contact, the bimetal bar then cooling and unflexing into engagement with said second detent arm and causing the latter to be disengaged from the latch when it has cooled to a predetermined temperature thereby terminating a toasting operation.

3. In an automatic electric toaster comprising toast heating elements, a bread carrier movable into toasting and non-toasting positions relatively to said toast heating elements and normally yieldingly biased into non-toasting position, a control switch for said toast heating elements normally yieldingly biased into open position, means to move said carrier into toasting position and said switch into closed position and a latch on said carrier, the improvement in thermal timing and detent means comprising a bimetal bar, an auxiliary electric heater for said bimetal bar, means to cause energization of said auxiliary electric heater when said control switch is closed, a first detent arm adapted to be engaged by said latch when said bread carrier is moved into toasting position and said switch is moved into closed position, a fixed contact electrically connected to one terminal of said auxiliary heater, a contact bar electrically connected to the other terminal of said auxiliary heater and normally out of engagement with said fixed contact, the heated bimetal bar flexing in a direction to engage and move said first detent arm into engagement with said contact bar and to move said contact bar into engagement with said fixed contact to short circuit said auxiliary heater when said bimetal bar has been heated to a given high temperature, said movement of the first detent arm causing release thereof from said latch, a second detent arm spring connected with said first detent arm and moved thereby into position to be engaged by said latch when the latter is disengaged from said first detent arm, said latch being effective when in engagement with said second detent arm to hold said contact bar in engagement with said fixed contact, the bimetal bar then cooling and unflexing into engagement with said second detent arm and causing the latter to be disengaged from the latch when it has cooled to a given lower temperature and thereby causing movement of the bread carrier into non-toasting position and movement of the switch into open position.

4. In an automatic electric toaster comprising toast heating elements, a bread carrier movable into toasting and non-toasting positions relatively to the toast heating elements and normally yieldingly biased into non-toasting position and means to move the carrier into toasting position, the improvement in thermal timing and detent means comprising a bimetal bar, an auxiliary electric heater for said bar, a fixed and a movable contact member connected respectively to the terminals of said auxiliary heater and normally out of engagement with each other, means actuated by said bread carrier to cause energization of said auxiliary heater and flexing of the bimetal bar in one direction, a first detent arm, a second detent arm, a latch on said carrier adapted to engage said first detent arm when the carrier has been moved into toasting position, said first detent arm being moved by said flexing bimetal bar into position to cause deenergization of said auxiliary heater, release of the latch from said first detent arm and movement of the latch into engagement with said second detent arm, said latch being effective while in engagement with said second detent arm to hold said first detent arm in position to continue deenergization of said auxiliary heater, the bimetal bar then cooling and unflexing into engagement with said second detent arm and effective at a given lower temperature to cause disengagement thereof from said latch and return of the bread carrier into non-toasting position.

5. In an automatic electric toaster comprising toast heating elements, a control switch for said toast heating elements normally yieldingly biased into open position and means to move said switch into closed position to initiate a toasting operation, the improvement in thermal timing and detent means comprising a bimetal bar, an auxiliary electric heater for said bimetal bar adapted to be energized by the closing of said control switch, a fixed and a movable contact member connected respectively to the terminals of said auxiliary heater and normally out of engagement with each other, a first and a second detent arm, a latch for holding said switch closed and moved into direct engagement with said first detent arm when said switch has been moved into closed position, energization of the auxiliary heater causing flexing of said bimetal bar in a given direction to cause movement of said first detent arm in said given direction to cause deenergization of said auxiliary heater, release of the latch from said first detent arm and movement of the latch into engagement with said second detent arm, said latch being effective while in engagement with said second detent arm to hold said first detent arm in position to continue deenergization of said auxiliary heater, the bimetal bar then cooling and unflexing into engagement with said second detent arm and effective at a given lower temperature to cause release of said second detent arm from the latch and opening of the control switch.

6. A device as set forth in claim 2 in which said first detent arm includes means for varying the given high temperature at which release of the latch from the first detent arm is effected.

7. A device as set forth in claim 2 and including a cam surface on said first detent arm engageable by said bimetal bar and means to bodily shift the bimetal bar relatively to said cam surface to vary said given high temperature at which the latch is released from said first detent arm.

8. A device as set forth in claim 2 and including a manually-actuable lever arm movable into mechanical engagement with only that detent arm engaging the latch to cause pivotal movement of the detent arm engaged by said lever arm and release of said detent arm from said latch.

9. A device as set forth in claim 2 and including a manually-actuable lever arm movable in a path to engage only said first detent arm during heating of the bimetal bar and to engage only the second detent arm during the cooling of the bimetal bar to cause release of the latch from the detent arm engaged thereby to terminate a toasting operation.

JOHN R. GOMERSALL.